Aug. 5, 1958
R. H. MILLER ET AL
2,846,622
OPERATING MECHANISM FOR AN ELECTRIC CIRCUIT BREAKER
Filed Sept. 21, 1956
3 Sheets-Sheet 1
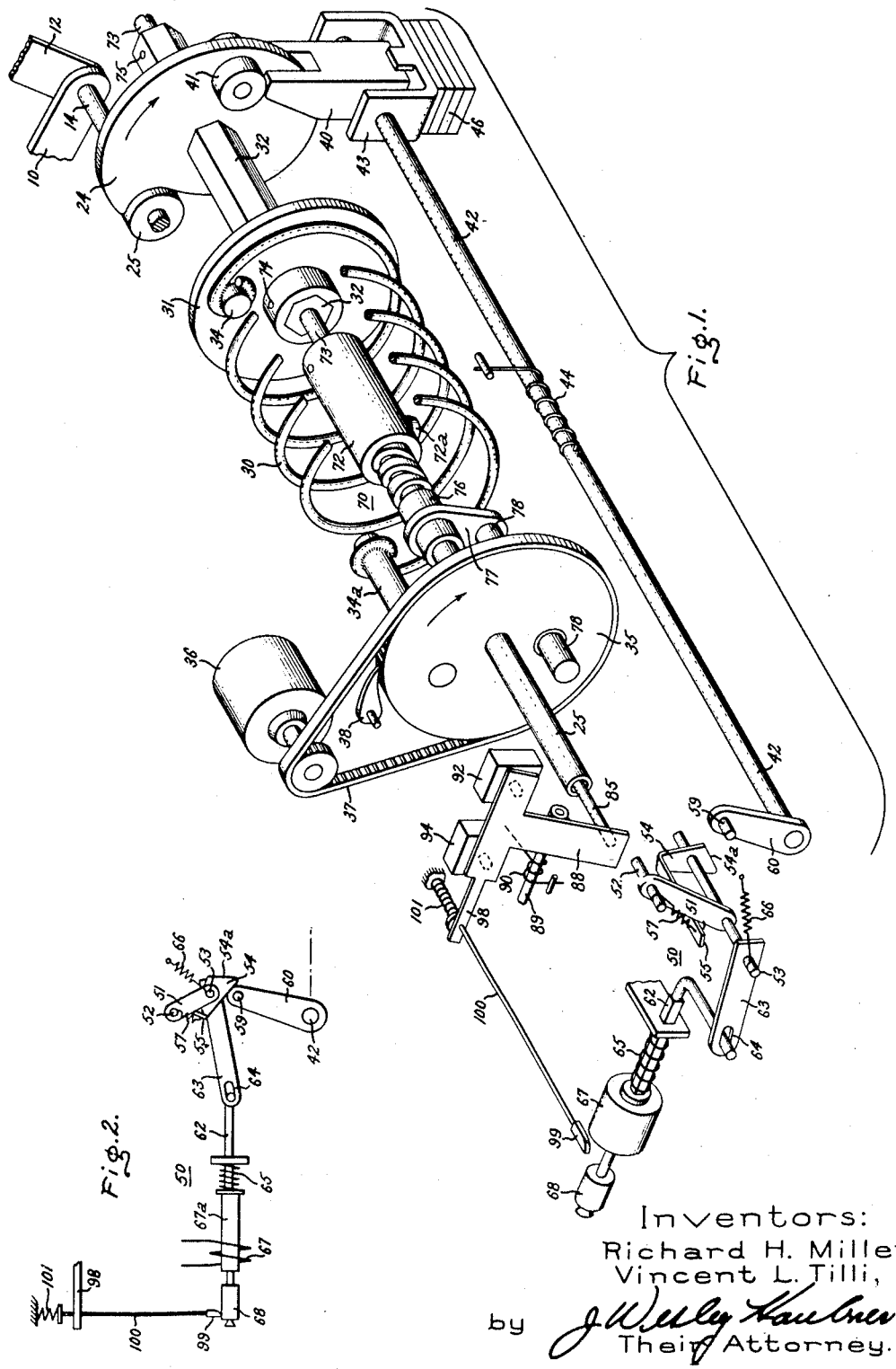
Inventors:
Richard H. Miller,
Vincent L. Tilli,
by J. Welley Kaufner
Their Attorney.

Inventors:
Richard H. Miller,
Vincent L. Tilli,
by J Wesley Hauber
Their Attorney.

Aug. 5, 1958    R. H. MILLER ET AL    2,846,622
OPERATING MECHANISM FOR AN ELECTRIC CIRCUIT BREAKER
Filed Sept. 21, 1956    3 Sheets-Sheet 3
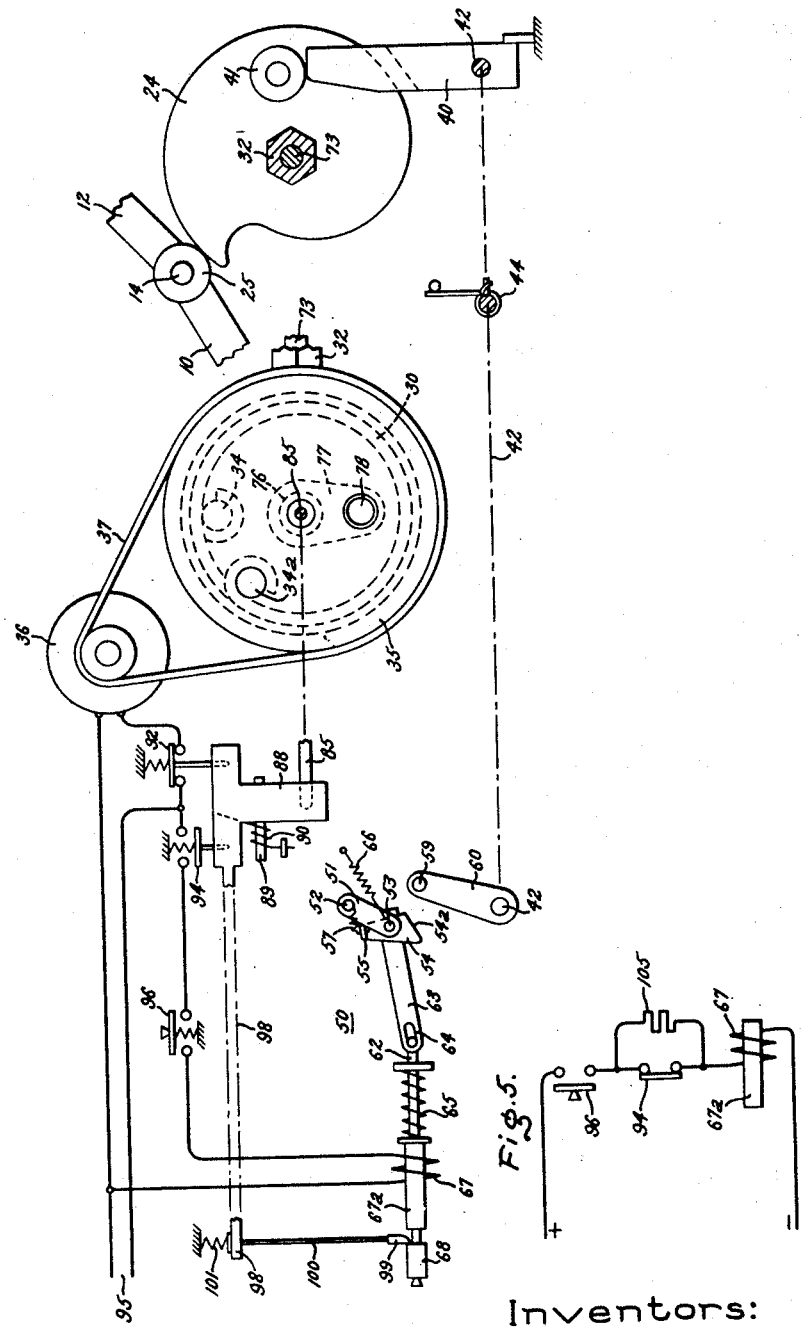
Inventors:
Richard H. Miller,
Vincent L. Tilli,
by J. Wesley Haubner
Their Attorney.

United States Patent Office 2,846,622
Patented Aug. 5, 1958

2,846,622

OPERATING MECHANISM FOR AN ELECTRIC CIRCUIT BREAKER

Richard H. Miller, Havertown, and Vincent L. Tilli, Philadelphia, Pa., assignors to General Electric Company, a corporation of New York Application September 21, 1956, Serial No. 611,331

11 Claims. (Cl. 317—58)

This invention relates to a stored-energy type of operating mechanism for an electric circuit breaker and, more particularly, to a control arrangement for controlling the operation of such a mechanism.

The invention has particular application to a circuit breaker closing-mechanism of the type which comprises energy-storing means, such as a spring, which is held in a charged condition by suitable restraining means which can be released to permit the spring to discharge and drive the breaker toward closed position. In such mechanisms, it is quite important that this releasing operation should not take place before the spring has sufficient energy stored therein to complete a fully-rated closing operation. Otherwise, the breaker might stall or close at such a low speed that excessive arcing and resultant contact burning would occur.

A closing control scheme which acts to insure against such premature release of the spring is shown and claimed in application S. N. 512,638, Coggeshall et al., now Patent No. 2,769,874, filed June 2, 1955, and assigned to the assignee of the present invention. That scheme, while satisfactory for many applications, is not entirely satisfactory where varying amounts of spring-charging action may be required in order to charge the spring to a safe energy level. This is the case because normal operation of the Coggeshall scheme permits the spring-restraining means to be released after a predetermined fixed amount of spring-charging action irrespective of the amount of energy then stored in the spring. This is of no particular disadvantage where the spring is never permitted to discharge to an abnormal extent because this fixed amount of spring-charging action would always restore the spring to a safe energy level, and proper operation would thus be assured. However, if for any reason the spring had been permitted to discharge to an abnormally low energy level, then this fixed amount of spring-charging action would not assure that the spring had been charged to a safe energy level.

Thus, an object of our invention is to insure against premature release of a stored-energy closing device even though varying amounts of charging action may be required in order to charge the device to a safe energy level.

Another object is to provide a control arrangement which provides the above insurance against premature release and which also properly controls the usual charging-motor for the stored-energy device.

Another object is to construct the control arrangement in such a manner that it is simple and inexpensive and requires little space external to the main parts of the closing device. This permits a high degree of compactness in the overall construction of the closing device.

Another object of our invention is to eliminate any tendency of the control arrangement to cause repeated operations of the stored-energy device in the event that the operation-initiating switch of the control arrangement is held closed for a protracted period of time.

In carrying out our invention in one form, we provide a rotatable circuit breaker operating-member, a chargeable spring having one end coupled to the operating member, and a rotatable spring-charging member coupled to the other end of the spring. The rotatable operating member is held in a predetermined position by releasable restraining means which can be released to permit said operating member to be driven by the spring to operate the breaker. A first controlling member is coupled to the rotatable operating member for rotation therewith, and a second controlling member is coupled to the charging member for rotation therewith. The charging member, the operating member, and the controlling members are all mounted for rotation about a common axis. One of the controlling members is mounted for axial movement relative to its corresponding rotatable member and to that spring-end which is coupled to said corresponding rotatable member. The controlling members are interconnected by means of a threaded connection which produces axial movement of said one controlling member relative to its corresponding rotatable member and spring-end in response to relative rotation between said rotatable members. Means controlled by this axial movement is provided for preventing release of said restraining means until the spring has been charged to a predetermined safe energy level.

For a better understanding of our invention, reference may be had to the following specification taken in connection with the accompanying drawing, wherein:

Fig. 1 is a schematic perspective view of a closing mechanism constructed in accordance with our invention with the parts thereof shown in the charged breaker-open position.

Fig. 2 is a schematic view of a portion of Fig. 1 with the parts being shown shortly after discharge of the closing mechanism has been initiated.

Fig. 4 is a schematic view further illustrating the parts of the mechanism in a discharged position.

Fig. 5 is a schematic circuit diagram illustrating a modified form of our invention.

Figure 3:
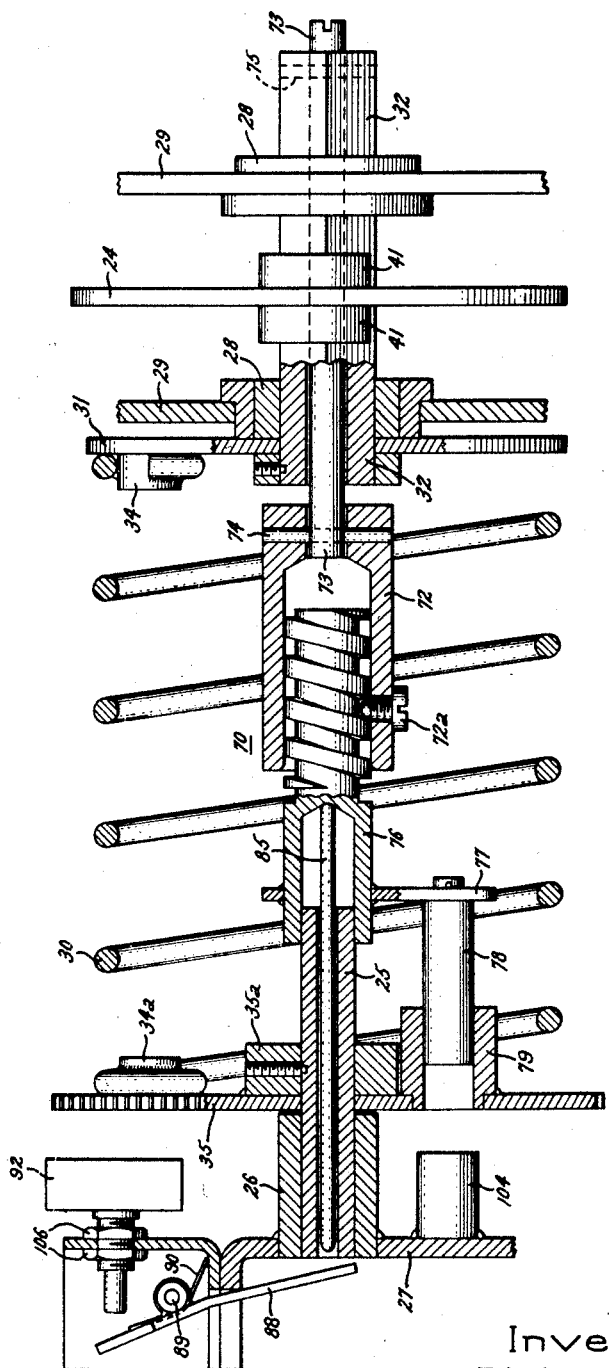
Fig. 3 is a cross-sectional view showing a portion of the closing mechanism in a discharged position.

Referring now to Fig. 1, the operating mechanism shown therein comprises a toggle 10, 12 pivotally joined together at a knee 14. This toggle 10, 12 is part of a conventional trip-free linkage which is coupled to the movable contact (not shown) of the circuit breaker. Since this linkage forms no part of the present invention and is described in detail in aforementioned Coggeshall application, it has not been shown in the present application. It is believed sufficient merely to understand that when the knee 14 is lifted from the position shown in Fig. 1, the toggle 10, 12 is extended and drives the movable contact of the breaker toward closed position against the bias of a suitable opening spring (also not shown).

This lifting of the knee 14 is accomplished by the action of a rotatable cam 24 cooperating with the usual roller 25 which is mounted at the knee 14. When the cam 24 is rotated clockwise through a complete revolution by means soon to be described, it moves from the position of Fig. 1 to the position of Fig. 4 and lifts the knee 14, thereby extending the toggle 10, 12 and closing the breaker. Fig. 4 shows this toggle portion of the breaker mechanism in closed position, where it is held by the force of the cam acting through the knee 14 to maintain the toggle 10, 12 extended.

For rotating the cam 24 to drive the circuit breaker closed, we have provided a stored-energy closing device which comprises a torsion spring 30 suitably coupled at one end to the cam 24. As shown in Fig. 1, this coupling comprises a disc 31 attached to the hexagonal cam shaft 32 and carrying a boss 34 to which the forward end of the spring is suitably anchored. The rear end of the spring is anchored by a suitable boss 34a to a rotatable sprocket 35.

Charging of the spring 30 is accomplished by rotating the sprocket 35 in a clockwise direction by means of a suitable charging motor 36 coupled to the sprocket 35 by means of a conventional chain drive 37. The manner in which this charging motor is controlled will appear more clearly hereinafter. Unwinding of the spring 30 at its rear end by possible back-tracking of the sprocket 35 is prevented by means of a suitable holding pawl 38.

It will be apparent from Fig. 3 that the sprocket 35 is supported for rotation by means of a tubular shaft 25 fixed to the sprocket hub 35a and supported in a suitable bearing 26, which is mounted on a stationary framework 27. The cam shaft 32 is generally coaxial with the sprocket shaft 25 and is supported for rotation by a pair of spaced-apart bearings 28 mounted on another stationary framework 29.

For controlling the rotation of the cam 24, we provide a latch or closing release prop 40 which, as shown in Fig. 1, cooperates with an abutment such as the roller 41 suitably secured to the cam 24. This prop 40 is keyed to an actuating shaft 42 which is journaled within a U-shaped bracket 43. The prop is biased into its holding position shown in Fig. 1 by means of a prop-resetting spring 44 surrounding the shaft 42. When the prop 40 is released, i. e., moved clockwise out of the path of the abutment 41, the main spring 30 is free to drive the cam 24 clockwise at high speed from the breaker-open position of Fig. 1. The prop 40 is reset to its holding position immediately and in ample time to arrest the movement of the cam 24 after it has rotated through a complete revolution to drive the breaker into the closed position shown in Fig. 4. The forces produced by the abutment 41 impacting against the prop 40 during this arresting action are effectively absorbed by a stack of yieldable buffers 46 mounted beneath the prop supporting bracket 43.

For releasing the prop 40 to effect closing of the breaker, as described above, a releasing device 50 is provided. This releasing device 50 is claimed in application S. N. 612,007, Miller et al., filed September 25, 1956, and assigned to assignee of the present invention, and its particular details form no part of the present invention. It is believed however that a brief description of its construction and operation would facilitate an understanding of the present invention. This releasing device 50 comprises a guide link 51 mounted for pivotal movement about a fixed pivot 52 and carrying at its lower end a transversely-extending actuating pin 53. Pivotally mounted on this pin 53 is an actuating pawl 54, which has a transversely projecting portion 55 contacting the rear side of the guide link 51. The projecting portion 55 is releasably held in this position by a spring 57 which allows the pawl to rotate counterclockwise about the pin 53 under certain conditions, which will soon be described. The actuating pawl 54 cooperates with a pin 59 carried by a crank 60 secured to the prop actuating shaft 42. When the actuating pin 53 is moved in a counterclockwise direction about its pivot 52 from the position of Fig. 1, the actuating pawl, with its lower surface 54a acting through the crank pin 59, rotates the crank 60 in a clockwise direction and thereby releases the prop 40. The lower surface 54a of the actuating pawl is so shaped that as soon as it effects this releasing action, it moves free of the crank pin 59 and permits the crank 60 to be returned to its original position by means of the prop resetting spring 44. This, of course, results in the prop being immediately reset in time to arrest the movement of the main cam 24 after it had been spring driven through a complete revolution to effect breaker-closing. The parts of the releasing device would occupy the position shown in Fig. 2 immediately after the prop had been released and had reset.

This prop-releasing action of the pawl 54 is produced by means of a slidable, suitably guided L-shaped operating rod 62 which is coupled to the actuating pin 53 by means of a connecting link 63. This connecting link 63 at one end is pivotally mounted on the actuating pin 53 and at its other end has a slot 64 which receives the outer leg of the operating rod. A compression spring 65 acting through the operating rod 62 maintains the parts of the releasing device in the normal or neutral position of Fig. 1 against the opposing bias of a weaker tension spring 66, which tends to move the actuating pin 53 counterclockwise about its pivot 52. The operating rod 62 can be operated either electrically, as by a suitable closing-release solenoid 67, or manually, as by applying a force to a plunger 68 secured to its outer end.

In case of either manual or electrical operation, if the operating rod 62, with the aid of the spring 66, is moved through its normal stroke to the right from its neutral position shown in Fig. 1, it acts through the connecting link 63 to move the actuating pin 53 counterclockwise about its pivot 52. This drives the pawl surface 54a into engagement with the crankpin 59 and produces the prop-releasing action described above. After release, the prop 40 immediately resets, as described above, and the parts of the releasing device 50 are then in the position of Fig. 2. When the operating rod 62 is thereafter released, the releasing device 50 resets under the influence of its spring 65, and the parts thereof are restored to their position of Fig. 1. During prop-releasing action, the pawl 54 acts against the pin 59 in an essentially unyielding manner due to engagement between the projection 55 and the guide link 51 as the actuating pin 53 moves counterclockwise. When the device is reset from Fig. 2, however, the pawl yields when it engages the crankpin 59, since the crankpin is then on an opposite side of the pawl. This yielding action continues until near the end of the resetting stroke, at which time the pawl has been dragged clear of the crankpin 59 and is free to reset under the influence of its own spring 57.

It should be apparent from Fig. 2 taken in connection with the above description that the releasing device 50 is incapable of again releasing the prop 40 so long as it is held in the position of Fig. 2 inasmuch as the crankpin 59 is then behind the pawl 54. To again release the prop 40, it is necessary to first reset the releasing device 50 at least partially to the position of Fig. 1 as described in the preceding paragraph.

For controlling the charging motor 36 and for ensuring against operation of the releasing device 50 before the motor 36 has charged the spring 30 to a safe energy level, we provide a controlling arrangement 70. This controlling arrangement 70 comprises a nut or nut-like member 72, which preferably is formed as a tubular sleeve having a screw 72a projecting radially into its bore. As shown in Fig. 3, the nut is coupled to the breaker-operating cam 24 by means of a calibrating rod 73, coaxial with the tubular cam shaft 32, and pinned at 74 and 75 to the nut 72 and the cam shaft 32, respectively. Meshing with the nut 72 is a threaded controlling rod 76 which is coupled to the spring-charging sprocket 35 for rotation therewith but is free to move axially with respect to the sprocket and with respect to the rear end of spring 30, which is coupled to the sprocket. The coupling between the sprocket 35 and the threaded member 76 comprises a crank 77 shown welded to the threaded member 76 and carrying at its outer end a crank-pin 78 which is slidably received in a boss 79 carried by the sprocket.

Referring to Fig. 3, if the sprocket 35 together with the threaded controlling member 76 is rotated in a spring-charging direction, then the nut 72 will act to shift the threaded controlling member axially outward. Conversely, if the breaker operating-cam 24 is thereafter released, its rotation will cause nut 72 to return the controlling member 76 axially inward to the position shown in Fig. 3. The manner in which this axial movement of the controlling member 76 is utilized will soon appear more clearly.

As will be apparent from Fig. 3, the threaded controlling member 76 has a tubular outer end which is slidably suported on the inner end of the sprocket shaft 25. A push rod 85 is loosely mounted in the coaxial bores of the tubular shaft 25 and the tubular controlling member 76. Cooperating with the push rod 85 and forming an additional part of the controlling arrangement 70, is a T-shaped switch-actuating lever 88. As shown in Fig. 3, this actuating lever 88 is pivotally mounted on the stationary framework 27 by means of a pivot 89 and is biased in a counterclockwise direction by a torsion spring 90. For reasons which will soon appear, this lever 88 serves to actuate a pair of switches 92 and 94 in response to appropriate axial movement of the push rod 85.

As shown in Fig. 4, the switch 92 is a normally biased-closed switch which is connected in series with the charging motor 36 across a suitable current source 95. The switch 94, on the other hand, is a normally biased-open switch which is connected across the current source in series with the coil of solenoid 67 and with a manually-operable switch 96. Because of their respective functions, the switch 92 is hereinafter termed the motor-controlling switch and the switch 94 is termed the releasing-device controlling switch.

Operation of the control arrangement 70 is as follows. Assume first that the main spring 30 has been discharged and the operating mechanism has just moved into the position of Figs. 3 and 4. The normally-closed motor switch 92 would then be closed and the motor would be driving sprocket 35 in such a direction that the threaded controlling member 76 would be moving axially outwardly due to its meshing engagement with the nut 72. This axially-outward movement of the controlling member 76 is transmitted through the push rod 85 to the switch actuating lever 88 and acts to open the motor-controlling switch 92 when the spring has been charged to a predetermined safe energy level. This motor cut-off terminates the charging operation, except for a slight amount of overtravel, after which the parts occupy the neutral position of Fig. 1.

As shown in Fig. 4, during the time that the main spring 30 was in the above-described discharged condition, the releasing-device control switch 94 was open and, thus, the manually-operable switch 96 was rendered ineffective to produce energization of the closing-release coil 67. Accordingly, electric operation of the releasing device 50 was prevented during this interval, and thus the danger of premature release of the main spring 30 was obviated. The releasing-device control switch 94 is so adjusted that just prior to motor cut-off during a spring-charging operation, it is closed by the action of the switch-actuating lever 88. As a result, when the parts have been motor-driven from position of Fig. 3 into the position of Fig. 1, as described in the preceding paragraph, the releasing-device control switch 94 is closed, and the manually-operable switch 96 is no longer disabled. With the control switch 94 closed, the manually-operable switch 96 can be selectively operated to again release the main spring 30 and close the breaker if it is then open.

Premature manual operation of the release device 50 is precluded in much the same manner as premature electrical operation. To this end, the switch-actuating lever 88 is provided with a projecting arm 98 which is suitably coupled to a blocking detent schematically shown at 99. This coupling includes a headed rod 100 which is slidably coupled to the projecting arm 98. A compression spring 101 acting through the headed rod 100 biases the detent toward an interfering position ahead of the plunger 68. When the switch-actuating lever 88 is in the position shown in Fig. 1, the blocking detent is held out of its position of interference with the plunger 68 by the projecting arm 98 engaging the head of rod 100. As a result, when the main spring is in its charged condition of Fig. 1, the plunger 68 can be moved to the right to operate the releasing device 50 without interference from the detent 99, as is desired. When, however, the main spring 30 is in its discharged condition, the switch-actuating lever 88 is so positioned that the detent 99 blocks manual operation of the plunger 68 from the neutral position of Fig. 1. This blocking relationship is shown in Fig. 4. If the plunger 68 should be held in its operated position of Fig. 2, then the detent 99 is prevented from moving into its blocking position ahead of the plunger, but as soon as the plunger is released, the detent is impelled by its spring 101 into the blocking position of Fig. 4. The fact that the detent 99 allows the plunger to be held in its operated position is of no disadvantage because only when the plunger is returned, at least partially, to its neutral position, is it again rendered capable of operating the releasing device 50.

When the releasing device 50 is operated to permit the main spring 30 to discharge, the resultant rotation of the nut 72 quickly withdraws the controlling member 76 from its extended position of Fig. 1. This allows the torsion spring 90 to drive the control-switch actuating lever 88 together with the push rod 85 into the position shown in Fig. 3. The motor control switch 92 is so adjusted that it is closed during the above operation after the control member 76 has been withdrawn only a minor amount. As a result, the motor 36 begins to wind the rear end of the spring 30 while its front-end is still discharging. Since the motor winds the spring at a much slower rate than the spring discharges, practically all of the charging operation takes place after the spring has discharged to drive the cam 24 through the one revolution required for breaker-closing. The fact that the motor control switch 92 is closed immediately after initiation of spring-discharge, instead of at some later point, is advantageous in that it allows the motor-control switch to be opened and closed at essentially the same point in the travel of controlling member 76. In contrast, if the motor control switch were closed near the end of the spring-discharging operation, then it would be necessary, in order to allow for a full-charging operation, that the motor control switch be opened at a different point in the travel of controlling member 76. This would necessitate certain complications in the switch 92 which our invention obviates.

An outstanding advantage of our control arrangement 70 is that it operates correctly even though varying amounts of spring-charging action may be required to charge the main-spring 30 to its predetermined safe energy level. For example, if for any reason, the prop 40 permitted two revolutions of the operating cam 24 instead of the desired one revolution, then the controlling arrangement 70 would cause the charging motor 36 to drive the charging sprocket 35 through two revolutions instead of the usual one revolution before the releasing-device control switch 94 was again closed to permit another operation of the releasing device 50. The two revolutions of the operating cam 24 would simply withdraw the controlling member 76 twice as far from the position of Fig. 1 as normal, and, as a result, twice the normal number of charging revolutions would be allowed before the controlling member 76 was returned to its original position.

It can thus be seen that, irrespective of the extent of the discharge operation, the controlling member 76 is withdrawn from its normal position by a distance which is proportional to the extent of the discharge operation, and, as a result, a corresponding amount of charging action is necessary in order to return the controlling member to its normal position. Thus, the spring is always charged to its predetermined safe energy level before the releasing-device control switch 94 is closed and before the blocking detent 99 is disabled. This feature is especially useful in those situations where the main spring is allowed to completely discharge, say as incident to inspection or repair, and thereafter the spring is recharged. Irrespective of the number of revolutions of the charging sprocket 35 required to recharge the spring, the releasing-device control switch 94 and the blocking detent 99 will maintain the releasing device 50 disabled until the spring has been charged to a safe energy level.

To insure that the main spring 30 will not be harmfully over-wound in case of failure of the motor control switch 92, we provide the framework 27 with a stationary abutment 104 cooperating with the crankpin 78. This abutment 104, which is best seen in Fig. 3, normally does not enter into the operation of the closing device. For example, when the main spring 30 is charged from its position of Fig. 3, the crank pin 78 moves axially outward in the sprocket boss 79, and, normally, this outward movement is terminated by motor cut-off before the crankpin 78 reaches an interfering position with respect to the abutment. However, in the possible event of failure of the motor cut-off switch 92, the crankpin 78 would continue to move axially outward in response to continued spring-charging until rotation of the sprocket 35 carried the crankpin 78 into circumferential engagement with the abutment 104. This would stall the charging motor and cause its fuse (not shown) to blow, thereby terminating the charging operation before the spring could be damaged thereby. The abutment 104 is especially useful in those situations where the main spring 30 is being manually wound (by suitable means—not shown). In such situations, the abutment 104 acts as the sole means for insuring that the charging operation is terminated before the spring is damaged.

It can be seen from Fig. 3 that the forces produced by circumferential engagement of the crankpin or stop means 78 and the abutment 104 are transmitted to the sprocket 35 and hence to the driving motor 36 by a path which bypasses the screw-threaded connection between the members 72 and 76. The crankpin 78, in effect, provides a direct rotation-preventing coupling between abutment 104 and sprocket 35. In contrast, if the crankpin 78 or some other part of controlling member 76 were allowed to be driven into axial, instead of circumferential, engagement with a fixed abutment, the screw-threaded connection would be included in the power path and would act as a force-multiplier which would develop unduly large forces when engagement occurred.

Another advantage of our controlling arrangement 70 lies in the ease with which it ca be adjusted and calibrated. By axially shifting the calibrating rod 73, the main controlling members 72 and 76 can be axially shifted in unison to any desired position. The position selected determines the point at which motor cut-off will occur during a spring-charging operation. Finer adjustments can be made by utilizing the adjusting nuts 106 for effecting minor changes in the position of the motor control switch 92. An alternative manner of adjusting the motor cut-off point is by rotating the calibrating rod 73 to axially shift the controlling member 76 into a preferred position. After the proper adjustments have been made, the calibrating rod is suitably fixed to the cam shaft, as by the pin 75.

It will be apparent from Fig. 3 that our controlling arrangement 70 allows for a high degree of compactness in the overall construction of the closing device. This follows primarily from the fact that the main operating parts of the control arrangement are located radially inwardly of the turns of the main spring 30. The fact that most of these parts are coaxially disposed with respect to the main shafts 32 and 25 also contributes to the compactness of the closing device. To insure that limited misalignment between the cam shaft 32 and the sprocket shaft 25 does not interfere with operation of the controlling arrangement 70, a slight degree of looseness is provided in the joint between pin 74 and the calibrating rod 73 and also between the rod 73 and the surrounding bore of nut 72.

One of the objects of our invention is to eliminate any tendency of the control arrangement to cause repeated operations of the stored-energy device 30—35 in the event that the operation-initiating switch 96 is held in its closed position for a protracted period of time. In the modification of Figs. 1–4, this tendency arises from the fact that the control switch 94 in opening when the spring 30 is discharged, effects deenergization of the solenoid 67, and in closing when the spring 30 has been charged, tends to effect reenergization of the solenoid. When the control switch 94 opens to deenergize the solenoid 67, this allows the releasing device 50 to reset to its position of Fig. 1 under the influence of its resetting spring 65. If the operation-initiating switch 96 is still being held when the motor 36 has charged the main spring 30 to close the control switch 94, the resulting reenergization of the solenoid 67 would again move the releasing device 50 into the position of Fig. 2, and thus cause an undesirable repeated release of the stored-energy device 30—35.

Fig. 5 illustrates a scheme which acts to overcome the above-described tendency toward repeated operations. In this scheme of Fig. 5, a resistor 105 is connected in shunt with the control switch 94 and in series with the coil of solenoid 67 and the operation-initiating switch 96. In all other respects, the scheme of Fig. 5 is the same as that of Figs. 1–4. This added resistor 105 is of such a size that, when the control switch 94 is open, the resistor allows sufficient current to flow through the solenoid coil 67 to maintain its armature, or driving part, 67a sealed-in should the armature then be in its operated position. Thus, if an operator holds the switch 96 closed for a protracted period of time, the releasing device 50 remains in a position such as shown in Fig. 2 in spite of opening of the control switch 94 during spring-discharge. As long as the releasing device 50 is held in this position of Fig. 2 and is not permitted to reset, it is incapable of reinitiating another operation of the stored-energy device 30—35, as previously described.

The resistor 105 is also of such a size that, should the control switch 94 be open, the resistor limits the current flowing through the solenoid coil to a value which is insufficient to cause pick-up of the solenoid armature, i. e., movement from its normal-deenergized position to its operated position. As a result, if the solenoid armature 67a is in its normal-deenergized position, as in Fig. 1 or Fig. 4, then closing of the operation-initiating switch 96 will be ineffective to produce solenoid operation if the control switch 94 is then open. Thus, in the scheme of Fig. 5 the control switch 94 is still capable of preventing operation of the releasing device 50 when the switch 94 is open. Accordingly, the scheme of Fig. 5 assures against premature release of the main spring 30 in the same general manner as that of Figs. 1–4.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. A control arrangement for an electric circuit breaker comprising a rotatable circuit breaker operating-member, restraining means for holding said operating member in a predetermined position, a chargeable spring having one end coupled to said operating member, a rotatable spring-charging member coupled to the other end of said spring, releasing means for releasing said restraining means to permit said circuit breaker operating member to be driven by said spring to operate said breaker, a nut-like controlling member coupled to one of said rotatable members and spring-ends for rotation therewith, a threaded controlling member meshing with said nut-like controlling member and coupled to the other of said rotatable members and spring-ends for rotation therewith, one of said controlling members being mounted for axial movement relative to its corresponding rotatable member and spring-end and being moved axially in response to relative rotation of said rotatable members, and means controlled by said axial movement for rendering said releasing means ineffective to release said restraining means whenever the amount of energy stored in said spring is below a predetermined level, said controlling members, said operating member, and said spring-charging member all being mounted for rotation about a common axis of rotation.

2. In an operating mechanism for an electric circuit breaker, a rotatable circuit breaker operating-member, restraining means for holding said operating member in a predetermined position, a chargeable spring having one end coupled to said operating member, a rotatable spring-charging member coupled to the other end of said spring, releasing means normally operable to release said restraining means to permit said circuit breaker operating member to be driven by said spring to operate said breaker, a pair of controlling members respectively coupled to said rotatable members for rotation therewith and axially movable with respect to each other, one of said controlling members being mounted for axial movement relative to its corresponding rotatable member and to that spring-end which is coupled to said corresponding rotatable member, means including a threaded connection between said controlling members for producing axial movement of said one controlling member relative to its corresponding rotatable member and spring-end in response to relative rotation between said rotatable members, and means controlled by said axial movement for disabling said releasing means whenever said spring is charged below a predetermined energy level and for rendering said releasing means operable when said spring is charged to at least said predetermined energy level, said controlling members, said operating member, and said spring-charging member all being mounted for rotation about a common axis.

3. In a circuit breaker operating mechanism, a rotatable circuit breaker operating-member, restraining means for holding said operating member in a predetermined position, a chargeable spring having one end coupled to said operating member, a rotatable spring-charging member coupled to the other end of said spring, said operating member and said spring-charging member being mounted for rotation about a common axis, manually-operable releasing means for releasing said restraining means to permit said circuit breaker operating-member to be driven by said spring to operate said breaker, a pair of controlling members respectively coupled to said rotatable members for rotation therewith about said common axis and axially movable with respect to each other, means including a threaded connection between said controlling members for producing axial movement of one of said controlling members in response to relative rotation between said rotatable members, said one controlling member being connected to its corresponding rotatable member in such a manner as to allow said axial movement to take place relative to said corresponding rotatable member and to that spring-end coupled to said corresponding rotatable member, detent means having an interfering position for blocking manual operation of said releasing means and a non-interfering position for allowing manual operation of said releasing means, and means responsive to axial movement of said one controlling member relative to its corresponding rotatable member and spring-end for moving said detent means to said interfering position whenever said spring is charged below a predetermined energy level and for moving said detent means into said non-interfering position when said spring is charged to at least said predetermined energy level.

4. An operating mechanism for an electric circuit breaker comprising a rotatable circuit breaker operating-member, restraining means for holding said operating member in a predetermined position, a torsion spring having one end coupled to said operating member, a rotatable spring-charging member axially spaced from said operating member and coupled to the other end of said spring, releasing means for releasing said restraining means to permit said operating member to be driven by said spring to operate said breaker, a nut-like controlling member located axially between said rotatable members and radially inwardly of the turns of said torsion spring, means for coupling said nut-like controlling member to one of said rotatable members and spring-ends for rotation therewith, a second controlling member coupled to the other of said rotatable members and spring-ends for rotation therewith and having threads meshing with said nut-like controlling member to produce axial movement of one of said controlling members in response to relative rotation between said rotatable members, said one controlling member being connected to its corresponding rotatable member and spring-end in such a manner as to allow said axial movement to take place relative to said corresponding rotatable member and spring-end, and means controlled by said axial movement for rendering said releasing means ineffective to release said restraining means whenever the amount of energy stored in said spring is below a predetermined level, said rotatable members and said controlling members having their axes of rotation generally collinear.

5. In an operating mechanism for an electric circuit breaker, a rotatable circuit breaker operating-member, a torsion spring having one end coupled to said operating-member, restraining means for holding said operating member in a predetermined position, a rotatable spring-charging member axially spaced from said operating member and coupled to the other end of said spring, said operating member and said spring-charging member being mounted for rotation about a common axis, releasing means for releasing said restraining means to permit said operating member to be driven by said spring to operate said breaker, motor means operable to drive said charging member to charge said spring, a nut-like controlling member located axially between said rotatable members and radially inwardly of the turns of said torsion spring, means coupling said controlling member to one of said rotatable members and spring-ends for rotation therewith about said common axis, a second controlling member coupled to the other of said rotatable members and spring-ends for rotation therewith about said common axis and having threads meshing with said nut-like controlling member to produce axial movement of one of said controlling members in response to relative rotation between said rotatable members, said one controlling member being connected to its corresponding rotatable member and spring-end in such a manner as to allow said axial movement to take place relative to said corresponding rotatable member and spring-end, and means controlled by said axial movement during a spring-charging operation for terminating operation of said motor means when the spring has been charged to a predetermined energy level.

6. In an operating mechanism for an electric circuit breaker, a rotatable circuit breaker operating-member, a chargeable spring having one end coupled to said operating member, restraining means for holding said operating member in a predetermined position, a rotatable spring-charging member coupled to the other end of said spring, said operating member and said spring-charging member being rotatable about a common axis, releasing means for releasing said restraining means to permit said spring to discharge and drive said circuit breaker operating member, motor means operatively connected to said charging member and operable to charge said spring at a lower speed than the speed at which said spring discharges, a pair of controlling members respectively coupled to said rotatable members for rotation therewith about a common axis and axially movable with respect to each other, means including a threaded connection between said controlling members for producing axial movement of one of said controlling members in response to relative rotation between said rotatable members, the coupling between said one controlling member and its corresponding rotatable member and spring-end allowing said axial movement to take place relative to said corresponding rotatable member and spring-end, and motor-control means controlled by said axial movement for initiating operation of said motor means whenever said spring discharges below a predetermined energy level and for terminating operation of said motor means when said spring is charged to essentially the same energy level, said motor-control means acting to initiate motor operation at the beginning of the spring-discharging operation.

7. In an operating mechanism for an electric circuit breaker, a rotatable circuit breaker operating-member, a chargeable spring having one end coupled to said operating member, a rotatable spring-charging member coupled to the other end of said spring, releasable restraining means normally holding said operating member in a predetermined position but releasable to permit said operating member to be driven by said spring to operate said breaker, stationary abutment structure loacted adjacent said spring-charging member and normally allowing free rotation of said charging member, stop means coupled to said charging member for rotation therewith and axially movable in response to relative axial movement between said controlling members, said stop means acting to circumferentially engage said stationary abutment structure in rotation-preventing relationship in response to abnormally prolonged rotation of said spring-charging member.

8. In an operating mechanism for an electric circuit breaker, a rotatable circuit breaker operating-member, a chargeable spring having one end coupled to said operating member, a rotatable spring-charging member coupled to the other end of said spring, releasable restraining means normally holding said operating member in a predetermined position but releasable to permit said operating member to be driven by said spring to operate said breaker, a pair of controlling members axially movable with respect to each other, means including a threaded connection between said controlling members for producing relative axial movement between said controlling members in response to relative rotation between said rotating members, stationary abutment means located adjacent said spring-charging member, stop means axially movable in response to relative axial movement of said controlling members, said stop means acting in response to abnormally prolonged rotation of said charging member to circumferentially engage said abutment structure to block further rotation of said charging member, and means for transmitting the forces produced by said engagement to said spring-charging member by a path which bypasses said screw threaded connection.

9. In an operating mechanism for an electric circuit breaker, a rotatable circuit breaker operating-member, a chargeable spring having one end coupled to said operating member, a rotatable spring-charging member coupled to the other end of said spring, releasable restraining means normally holding said operating member in a predetermined position but releasable to permit said operating member to be driven by said spring to operate said breaker, motor means operable to drive said charging member to charge said spring, a first controlling member located axially between said rotatable members and radially inward of the turns of said torsion spring, a calibrating rod coaxially disposed relative to one of said rotatable members and coupling said controlling member to said one rotatable member, a second controlling member coupled to the other of said rotatable members, a threaded connection between said controlling members for producing relative axial movement of said controlling members in response to relative rotation of said rotatable members, and means controlled by said axial movement during a spring-charging operation for terminating operation of said motor means when said spring is charged to at least a predetermined energy level, said calibrating rod projecting to a point axially spaced from the region between said rotatable members and being adjustable relative to its rotatable member to adjust the point at which the spring-charging operation is terminated.

10. In an electric circuit breaker, stored-energy means which is releasable to effect closing of the breaker, electromagnetic means having a driving part operable from a neutral position to an operated position, control means responsive to movement of said driving part from said neutral to said operated position for releasing and thereafter restraining said stored-energy means thereby to effect a circuit breaker closing operation, said control means being ineffective to again release said stored-energy means until said driving part is returned at least partially to its neutral position, a selectively-operable first switch connected in series-circuit relationship with said electromagnetic means, charging means for automatically recharging said stored-energy means after its discharge, a second switch connected in series-circuit relationship with said electromagnetic means and with said first switch, means for opening said second switch in response to discharge of said stored-energy means and for closing said second switch in response to said stored-energy means being charged to a predetermined safe energy level, and means comprising a seal-in circuit for maintaining said driving part in said operated position in the event that said first switch is held closed during the time said second switch is open.

11. In an electric circuit breaker, stored-energy means which is releasable to effect closing of the breaker, electromagnetic means having a driving part operable from a neutral position to an operated position, control means responsive to movement of said driving part from said neutral to said operated position for releasing and thereafter restraining said stored-energy means thereby to effect a circuit breaker closing operation, said control means being ineffective to again release said stored-energy means until said driving part is returned at least partially to its neutral position, a selectively-operable first switch connected in series-circuit relationship with said electromagnetic means, charging means for automatically recharging said stored-energy means after its discharge, a second switch connected in series-circuit relationship with said electromagnetic means and with said first switch, means for opening said second switch in response to discharge of said stored-energy means and for closing said second switch in response to said stored-energy means being charged to a predetermined safe energy level, and impedance means connected in shunt relationship with said second switch and in series relationship with said first switch to provide a seal-in circuit for maintaining the driving part of said electromagnetic control means in its operated position in the event that said first switch is held closed during the time said second switch is open.

References Cited in the file of this patent
UNITED STATES PATENTS

| | | |
|---|---|---|
| 2,304,865 | Thumim | Dec. 15, 1942 |
| 2,349,647 | Boisseau | May 23, 1944 |